United States Patent
Park et al.

(10) Patent No.: US 8,891,674 B2
(45) Date of Patent: Nov. 18, 2014

(54) DIGITAL TRANSMISSION SYSTEM FOR TRANSMITTING ADDITIONAL DATA AND METHOD THEREOF

(75) Inventors: Eui-jun Park, Seoul (KR); June-hee Lee, Seongnam-si (KR); Kyo-shin Choo, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 468 days.

(21) Appl. No.: 12/528,563

(22) PCT Filed: Feb. 11, 2008

(86) PCT No.: PCT/KR2008/000785
§ 371 (c)(1),
(2), (4) Date: Aug. 25, 2009

(87) PCT Pub. No.: WO2008/105587
PCT Pub. Date: Sep. 4, 2008

(65) Prior Publication Data
US 2010/0118994 A1    May 13, 2010

(30) Foreign Application Priority Data
Feb. 26, 2007    (KR) .................. 10-2007-0019098

(51) Int. Cl.
| | |
|---|---|
| H04K 1/02 | (2006.01) |
| H04L 25/03 | (2006.01) |
| H04L 25/49 | (2006.01) |
| H04H 20/31 | (2008.01) |
| H04L 27/26 | (2006.01) |

(52) U.S. Cl.
CPC .......... *H04H 20/31* (2013.01); *H04L 27/2626* (2013.01); *H04L 27/2618* (2013.01)
USPC ............ 375/297; 375/260; 375/268; 375/286

(58) Field of Classification Search
USPC ......... 375/259–260, 268–270, 285, 295–297, 375/300–301
See application file for complete search history.

(56) References Cited

U.S. PATENT DOCUMENTS

| | | | |
|---|---|---|---|
| 6,870,883 | B2 * | 3/2005 | Iwata ....................... 375/240.01 |
| 7,376,074 | B2 | 5/2008 | Jung et al. |

(Continued)

FOREIGN PATENT DOCUMENTS

| | | |
|---|---|---|
| CN | 86100008 A | 7/1987 |
| CN | 1467996 A | 1/2004 |

(Continued)

OTHER PUBLICATIONS

Communication issued Sep. 19, 2010 from the State Intellectual Property Office of P.R. China in counterpart Chinese application No. 200880001303.8.

(Continued)

*Primary Examiner* — Sam K Ahn
*Assistant Examiner* — James M Perez
(74) *Attorney, Agent, or Firm* — Sughrue Mion, PLLC (57) ABSTRACT

A digital transmission system is provided. The system includes a transmission signal generation unit which generates transmission signals by loading data to be transmitted on carrier waves; and an additional data processing unit which loads a low power signal expressing additional data on the carrier waves on which the data is loaded by the transmission signal generation unit. The system may be embodied as an orthogonal frequency division multiplexing (OFDM) system such as a Digital Video Broadcasting-Terrestrial (DVB-T) system, or a single carrier system such as a Vestigial Sideband (VSB) system.

20 Claims, 5 Drawing Sheets

(56) References Cited

U.S. PATENT DOCUMENTS

| | | | |
|---|---|---|---|
| 7,649,950 B2 | 1/2010 | Shen et al. | |
| 7,920,602 B2 | 4/2011 | Park et al. | |
| 8,130,798 B2 | 3/2012 | Park et al. | |
| 8,135,044 B2 | 3/2012 | Park et al. | |
| 8,194,705 B2 | 6/2012 | Park et al. | |
| 2002/0018520 A1* | 2/2002 | Eidson | 375/150 |
| 2003/0202460 A1 | 10/2003 | Jung et al. | |
| 2005/0041693 A1* | 2/2005 | Priotti | 370/503 |
| 2005/0073610 A1* | 4/2005 | Akiyama et al. | 348/705 |
| 2005/0113040 A1 | 5/2005 | Walker et al. | |
| 2005/0176436 A1* | 8/2005 | Mantravadi et al. | 455/450 |
| 2005/0220173 A1* | 10/2005 | Zyren et al. | 375/130 |
| 2006/0072623 A1 | 4/2006 | Park | |
| 2006/0154622 A1* | 7/2006 | Piirainen | 455/115.1 |
| 2006/0193393 A1 | 8/2006 | Shen et al. | |
| 2006/0262863 A1 | 11/2006 | Park et al. | |
| 2007/0195690 A1* | 8/2007 | Bhushan et al. | 370/208 |
| 2008/0008082 A1* | 1/2008 | Ma et al. | 370/203 |
| 2008/0049602 A1 | 2/2008 | Jung et al. | |
| 2008/0240217 A1* | 10/2008 | Lee et al. | 375/227 |
| 2009/0033804 A1 | 2/2009 | Park et al. | |
| 2009/0040392 A1 | 2/2009 | Park et al. | |
| 2009/0074081 A1 | 3/2009 | Park et al. | |
| 2010/0118994 A1* | 5/2010 | Park et al. | 375/260 |

FOREIGN PATENT DOCUMENTS

| | | | |
|---|---|---|---|
| CN | 1758641 A | 4/2006 | |
| CN | 1822583 A | 8/2006 | |
| EP | 1357718 A2 | 10/2003 | |
| EP | 2157795 A2 | 2/2010 | |
| KR | 1020030084291 A | 11/2003 | |
| KR | 10-2005-0050328 A | 5/2005 | |
| KR | 10-2005-0057927 A | 6/2005 | |
| KR | 1020060121107 A | 11/2006 | |
| KR | 10-668662 B1 | 1/2007 | |
| WO | 00/16506 A1 | 3/2000 | |
| WO | 03/092197 A1 | 11/2003 | |
| WO | 2004/023818 A1 | 3/2004 | |
| WO | WO2006068347 A1 * | 6/2006 | H04J 11/00 |
| WO | 2006/126805 A1 | 11/2006 | |

OTHER PUBLICATIONS

Communication issued Aug. 16, 2012 by the European Patent Office in counterpart European application No. 08712434.

Communication, dated May 3, 2013, issued by the Korean Patent Office in counterpart Korean Application No. 10-2007-0019098.

* cited by examiner

DIGITAL TRANSMISSION SYSTEM FOR TRANSMITTING ADDITIONAL DATA AND METHOD THEREOF

CROSS-REFERENCE TO RELATED APPLICATIONS

This application is a National Stage of International Application No. PCT/KR2008/000785 filed Feb. 11, 2008 and claims priority from Korean Patent Application No. 10-2007-0019098, filed Feb. 26, 2007 in the Korean Intellectual Property Office, the disclosure of which is incorporated herein by reference in its entirety.

BACKGROUND

1. Field of the Invention

Systems and methods consistent with the present invention relate to a digital transmission system and a data transmission method thereof. More particularly, the present invention relates to a digital transmission system which transmits a transmission signal into which a low power signal expressing additional data is inserted, and a data transmission method thereof.

2. Description of the Related Art

As electronic and communication technology has developed, digital technology has been introduced into the field of broadcasting systems and diverse standards for digital broadcasting have been released. The diverse standards include a U.S. Advanced Television System Committee (ATSC) Vestigial Sideband (VSB) standard and a European Digital Video Broadcasting-Terrestrial (DVB-T)standard. These standards have differences in many aspects, such as their audio compression schemes and channel bands, but the main difference is that the ATSC VSB standard uses a single-carrier scheme and the DVB-T standard uses a multi-carrier scheme. In particular, the DVB-T standard adopts an Orthogonal Frequency Division Multiplexing (OFDM) method as a standard in order to reduce interference between channels.

OFDM transmits data using a multi-carrier, converts a serially input symbol row into parallel data streams, and modulates each stream with a plurality of orthogonal sub-carriers.

A single-carrier transmission scheme in which data are carried in a single carrier and transmitted has high interference between symbols, so distortion increases. As a result, the complexity of an equalizer in a receiver increases. OFDM is introduced in order to solve this problem of the single-carrier transmission scheme.

As described above, efforts have been made worldwide to provide effective transmission and reception of broadcast signals using digital technology. Specifically, data transmission methods, such as wireless local area network (LAN), code division multiple access (CDMA), time division multiple access (TDMA), or methods using a cable, are used.

Data, such as broadcast signals and other signals, as well as additional data can be transmitted to televisions (TVs). For example, urgent rescue text broadcasting must be transmitted to TV viewers even if the television is in an unavailable broadcast transmission state or in unavailable broadcast transmission areas. However, in a conventional digital transmission system, there are no methods for effectively adding the additional data other than generating transmission streams in which the additional data are encoded.

SUMMARY OF THE INVENTION

The present invention provides a digital transmission system which generates a transmission signal and loads a low power signal expressing additional data in the transmission signal so that the additional data can be efficiently transmitted without degrading the main data transmission quality, and a data transmission method thereof.

According to an exemplary aspect of the present invention, there is provided a digital transmission system including a transmission signal generation unit which generates transmission signals by loading data to be transmitted on carrier waves, and an additional data processing unit which additionally loads low power signal expressing additional data on the carrier waves.

The transmission signal generation unit may generate the transmission signals using an Orthogonal Frequency Division Multiplexing (OFDM) method by loading the data on multi-carrier waves.

The additional data processing unit may load the low power signals on the multi-carrier waves using at least one of a Pseudo random (PN) sequence, a gold sequence, and a Kasami sequence.

The additional data processing unit may encode the low power signals and load the encoded low power signals on the multi-carrier waves.

The additional data processing unit may load the low power signal on at least one of an in-band area, in which data are inserted, and an out-band area, which forms a guard between channels, in the multi-carrier wave.

The additional data processing unit may divide the multi-carrier waves into a plurality of groups, and load low power signals expressing a single set of additional data on each group, so that a plurality set of additional data are transmitted.

The transmission signal generation unit may include a data splitter which performs modulation to load the data on the multi-carrier waves, a inverse fast Fourier transform (IFFT) processing unit which performs IFFT of the multi-carrier signals generated by the data splitter, a parallel-to-serial converter which converts the IFFT-processed multi-carrier signals into a single serial signal, and a digital-to-analog converter which converts the serial signal from a digital format to an analog format.

The additional data processing unit may include a reception unit which receives the additional data from an external source, and generates the low power signals in a frequency domain, and a signal insertion unit which loads the low power signals on the multi-carrier signals generated by the data splitter.

The additional data processing unit may include a reception unit which receives the additional data from an external source, and generates the low power signals in a time domain, and a signal insertion unit which loads the low power signals on the multi-carrier signals output by the IFFT processing unit.

The signal insertion unit may increase a number of expression bits of the multi-carrier wave, and add bits corresponding to the low power signal to the increased bits.

The additional data processing unit may include a reception unit which receives the additional data from an external source, and generates the low power signals in a time domain, and a signal insertion unit which loads the low power signals on the analog signals output by the digital-to-analog converter.

The low power signals may express compensation data for canceling a peak-to-average power ratio (PAPR).

The transmission signal generation unit may generate the transmission signals using VSB standard by loading the data on single-carrier waves.

The additional data processing unit may receive the additional data from an external source, generate the low power signals in a time domain, and load the low power signals on the transmission signals.

According to another exemplary aspect of the present invention, there is provided digital transmission method including generating transmission signals by loading data to be transmitted on carrier waves, and additionally loading low power signal expressing additional data on the carrier waves.

In the transmission signal generating operation, the transmission signals may be generated using an OFDM method by loading the data on multi-carrier waves.

In the low power signal loading operation, the low power signals may be loaded on the multi-carrier waves using at least one of a PN sequence, a gold sequence, and a Kasami sequence.

In the low power signal loading operation, the low power signals may be encoded and loaded on the multi-carrier waves.

In the low power signal loading operation, the low power signal may be loaded on at least one of an in-band area, in which data are inserted, and an out-band area, which forms a guard between channels, in the multi-carrier wave.

In the low power signal loading operation, the multi-carrier waves may be divided into a plurality of groups, and low power signals expressing a single set of additional data may be loaded on each group, so that a plurality set of additional data are transmitted.

The transmission signal generation operation may include generating multi-carrier signals by performing modulation to load the data on the multi-carrier waves, performing IFFT of the multi-carrier signals, converting the IFFT-processed multi-carrier signals into a single serial signal, and converting the serial signal from a digital format to an analog format.

The low power signal loading operation may include receiving the additional data from an external source, and generating the low power signals in a frequency domain, and loading the low power signals on the multi-carrier signals.

The low power signal loading operation may include receiving the additional data from an external source, and generating the low power signals in a time domain, and loading the low power signals on the IFFT-processed multi-carrier signals.

In the operation of loading the low power signals on the IFFT-processed multi-carrier signals, a number of expression bits of the multi-carrier wave may be increased, and bits corresponding to the low power signal may be added to the increased bits.

The low power signal loading operation may include receiving the additional data from an external source, and generating the low power signals in a time domain, and loading the low power signals on the digital-to-analog-converted signals.

The low power signals may express compensation data for canceling a peak-to-average power ratio (PAPR).

In the transmission signal generation operation, the transmission signals may be generated using the VSB standard by loading the data on single-carrier waves.

In the low power signal loading operation, the additional data may be received from an external source, and the low power signals may be generated in a time domain and may be loaded on the transmission signals.

According to a further aspect of the present invention, if a transmission signal is generated, a low power signal expressing additional data is loaded to the transmission signal, so the additional data can be efficiently transmitted without degrading main data transmission quality. In particular, since additional data such as urgent rescue broadcasting can be securely transmitted, greater protection of human lives can be provided. In addition, a diverse range of additional data other than urgent rescue broadcasting can be broadly utilized. Such a digital transmission system and a transmission method thereof according to the present invention can be adapted to both DVB-T and VSB standards.

The present invention can be applied to a digital broadcast system which provides data to both a receiving system using main data and a receiving system using additional data.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS

Hereinafter, exemplary embodiments of the present invention are described in detail with reference to the enclosed drawings.

Figure 1:
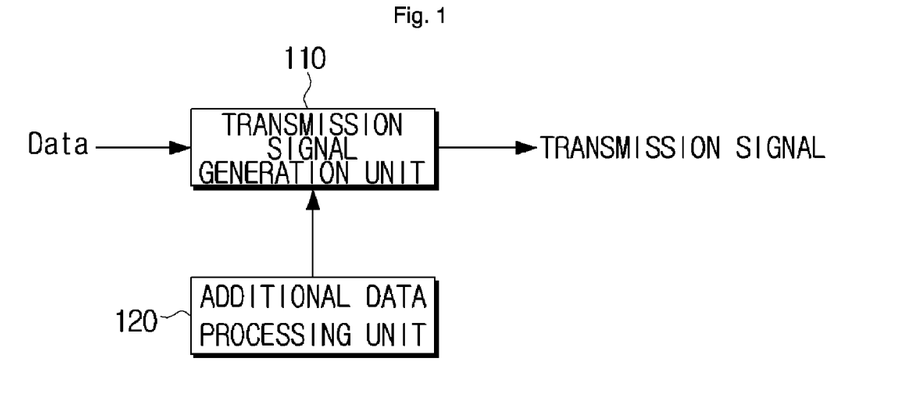
FIG. 1 is a block diagram illustrating a digital transmission system according to an exemplary embodiment of the present invention.

FIG. 1 is a block diagram illustrating a digital transmission system according to an exemplary embodiment of the present invention. The digital transmission system includes a transmission signal generation unit 110 and an additional data processing unit 120.

The transmission signal generation unit 110 receives data to be transmitted, and generates a transmission signal by loading the data in a single-carrier wave or a multi-carrier wave according to the DVB-T or VSB standard.

The additional data processing unit 120 loads a low power signal expressing additional data in a transmission signal so that the low power signal can be transmitted to a receiver. The receiver detects the low power signals from carrier waves and combines the low power signals so that additional data can be detected.

As described above, the configuration of the transmission signal generation unit 110 can vary according to whether an OFDM transmission system such as DVB-T or wireless LAN, or a single-carrier system such as VSB is used.

Figure 2:
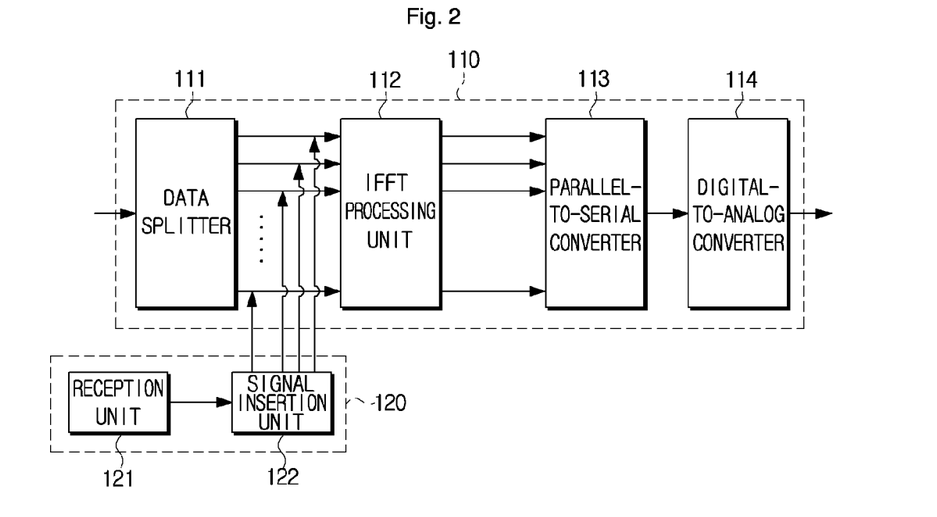
FIG. 2 is a block diagram illustrating an exemplary configuration of the digital transmission system of FIG. 1.

FIG. 2 is a block diagram illustrating an exemplary configuration of a digital transmission system according to the DVB-T standard. In FIG. 2, the transmission signal generation unit 110 includes a data splitter 111, an IFFT processing unit 112, a parallel-to-serial converter 113, and a digital-to-analog converter 114.

The data splitter 111 outputs a multi-carrier signal by loading data to be transmitted on a multi-carrier wave. More specifically, the data splitter 111 codes the data using a preset coding method, and performs symbol mapping, so that a modulated symbol can be generated and converted in parallel into a plurality of symbols. As a result, a multi-carrier signal can be generated. Modulation methods may include Quadrature Phase Shift Keying (QPSK), 16-Quadrature Amplitude Modulation (QAM), and 64-QAM.

To do so, the data splitter 111 may include an encoder (not shown), a symbol mapping device (not shown), a serial-to-parallel converter (not shown) and a pilot symbol inserter (not shown).

The IFFT processing unit 112 performs an inverse fast Fourier transform of the multi-carrier signal, so a frequency domain signal is converted into a time domain signal.

The parallel-to-serial converter 113 converts the multi-carrier signal processed by the IFFT processing unit 112 into a single serial signal.

The digital-to-analog converter 114 converts the digital serial signal output by the parallel-to-serial converter 113 into analog format.

Since the configuration of the transmission signal generation unit 110 according to the DVB-T standard has already been published, detailed description is omitted here.

The additional data processing unit 120 includes a reception unit 121 and a signal insertion unit 122.

The reception unit 121 receives additional data from an external source (not shown), and generates a low power signal in a frequency domain in order to express the additional data.

The signal insertion unit 122 loads generated respective low power signals on respective multi-carrier signals generated by the data splitter 111. That is, the additional data are inserted in the frequency domain.

In this case, if the electric power of each of the signals expressing the additional data is adjusted to be much lower than the multi-carrier signal, the additional data can be transmitted without affecting the transmission quality of the multi-carrier signal.

Furthermore, since the transmission power of the additional data is consequently greater than the transmission power of the main data, the additional data can be stably transmitted. For example, if multi-carrier signals are generated using 8*1024 multi-carriers waves, additional data of 1 bit which is lower than transmission power of main data by 30 dB are loaded and transmitted on each of the entire multi-carrier signals, and a receiver restores the additional data using the entire multi-carrier signals. In this case, the power of the additional data is 8*1024=2 13-fold, and so has a power of 3*13 dB=39 dB. Accordingly, the additional data are transmitted at the power which is greater than the transmission power of the main data by 39-30 dB=9 dB. As a result, additional data such as urgent rescue broadcasting can be securely transmitted to the TV viewers in areas having low main data transmission quality.

The signal insertion unit 122 may load the low power signals on the entire multi-carrier signals or on part of the multi-carrier signals. That is, the number of channels to transmit the additional data can be determined according to design. The power of the signals expressing the additional data can also be adjusted.

In addition, the signal insertion unit 122 may divide multi-carrier waves into a plurality of groups, and load low power signals expressing a single set of the additional data on each group.

In greater detail, the signal insertion unit 122 can load low power signals on the multi-carrier signals using a PN sequence, a gold sequence, and a Kasami sequence. As described above, additional data of one bit can be transmitted using a single PN sequence, and diverse additional data can be transmitted using a plurality of sequences. For example, if the total of number of multi-carrier signals is 8*1024, the additional data can be transmitted using two PN sequences each having a length of 4*1024. In this case, the length of the sequences can be adjusted according to the number of multi-carriers in use. That is, long sequences can be used by being split, and short sequences can be used by being repeated.

The signal insertion unit 122 may load each low power signal on each multi-carrier signal by encoding the low power signal using a repetition code or a convolutional code. Reception performance can be enhanced by reducing the coding rate or increasing the signal power by repeated signal loading.

Figure 3:
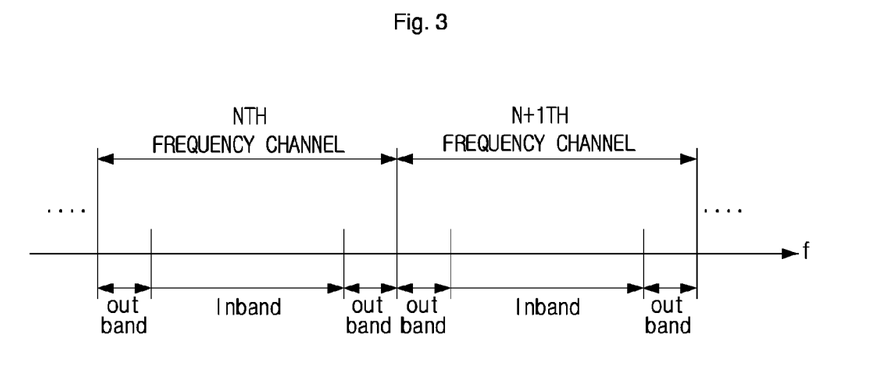
FIG. 3 is a mimetic diagram illustrating a portion in which a signal for transmitting additional data is loaded according to an exemplary embodiment of the present invention.

FIG. 3 is a mimetic diagram illustrating a portion in which a signal for transmitting additional data is loaded. In FIG. 3, there are a plurality of frequency channels between a transmitter and a receiver, and data are transmitted using frequency channels allocated according to the broadcast station.

Each frequency channel ( . . . , n, n+1, . . . ) includes an in-band area in which data are inserted, and out-band areas which form a guard between channels. The signal insertion unit 122 can load low power signals in the in-band area, the out-band area, or in-band and out-band areas.

Figure 4:
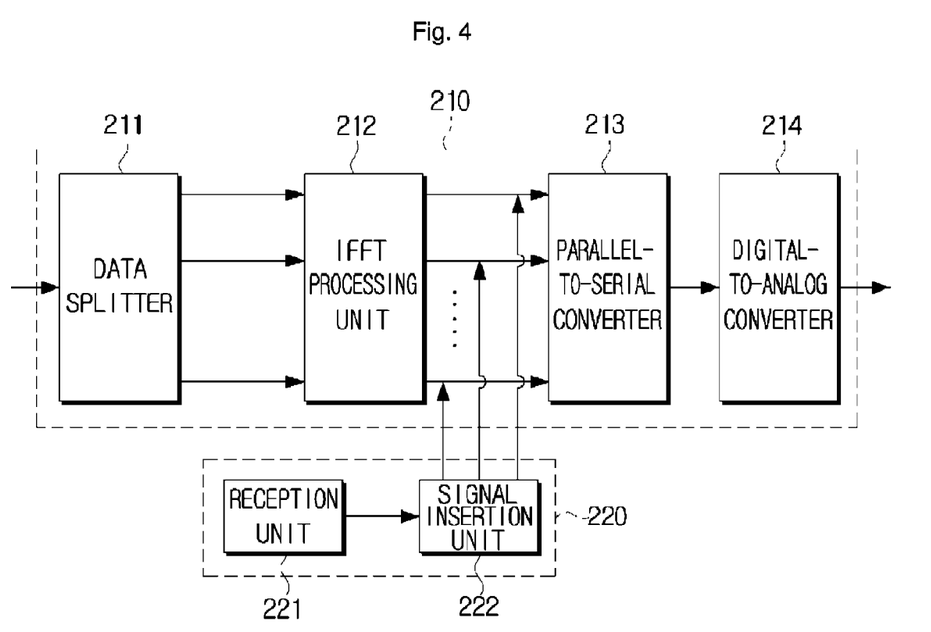
FIGS. 4 to 6 are block diagrams illustrating the configuration of a digital transmission system according to diverse exemplary embodiments of the present invention.

FIG. 4 is a block diagram illustrating the configuration of a digital transmission system according to another exemplary embodiment of the present invention. The digital transmission system of FIG. 4 includes a transmission signal generation unit 210 and an additional data processing unit 220. The transmission signal generation unit 210 can have the same configuration as the transmission signal generation unit 110 of FIG. 2, including a data splitter 211, an IFFT processing unit 212, a parallel-to-serial converter 213, and a digital-to-analog converter 214. Since the functions and operations of the shared elements are the same, description thereof is omitted here.

The additional data processing unit 220 includes a reception unit 221 and a signal insertion unit 222. Low power signals expressing additional data are converted into time domain signals, and inserted into each multi-carrier signal.

More specifically, the reception unit 221 receives low power signals from an external source or receives additional data, and generates and transmits to the signal insertion unit 222 a plurality of time domain low power signals. The signal insertion unit 222 inserts low power signals into each carrier signal output by the IFFT processing unit 212.

A time domain carrier signal includes a preamble at the beginning, a guard interval, and a data area, where the guard interval and data area are repeated. The preamble provides a receiver with information for channel equalization and synchronization. The guard interval is inserted between data in order to reduce interference between symbols.

The signal insertion unit 222 may load the low power signal on at least one of the preamble, guard interval and data area using regular sequences such as the PN sequence as described above, or using diverse encoding methods.

FIG. 4 illustrates a case wherein low power signals are inserted into signals output by the IFFT processing unit 212, but low power signals can be inserted into serial signals output by the parallel-to-serial conversion unit 213.

A transmission signal generated passing through the IFFT processing unit 312 and the parallel-to-serial conversion unit 313 has a digital format before entering the digital-to analog converter 314. Therefore, the exemplary embodiment of FIG. 4 illustrates a case of loading a time domain signal in a digital format. In order to load a signal in a digital format, the signal insertion unit 222 adjusts the number of bits which are used for mapping. That is, the number of bits expressing multi-carrier are increased, and bits corresponding to low power signals are added to the increased bits.

For example, if a related art QPSK mapping method is used, 4 symbols can be expressed using 2 bits, for example, (0,0), (0,1), (1,0), and (1,1). In order to add bits expressing additional data of a small size, sign bits can be added and the number of bits expressing decimal fractions can be increased by 5.

More specifically, if it is assumed that 0 refers to −1, and 1 refers to +1, and if sign bits are added, (10, 10), (10, 01), (01,10), and (01,01) are obtained. If 5 bits expressing decimal fraction are added, (1000000, 1000000), (1000000, 0100000) (0100000, 1000000), and (0100000, 0100000) are obtained. In this state, if a low power signal (0000001,0000001) having a power $1/1024$ $(=(1/2^5)^2)$ is added, (1000001, 1000001), (1000001, 0100001) (0100001, 1000001), and (0100001, 0100001) are obtained.

By mapping these converted codes in a designated location, low signal loading is performed. This method can also be used in a frequency domain.

Inserting low power signals in a digital format has been described above. However, in another exemplary embodiment of the present invention, low power signals can be inserted after being converted into an analog format.

Figure 5:
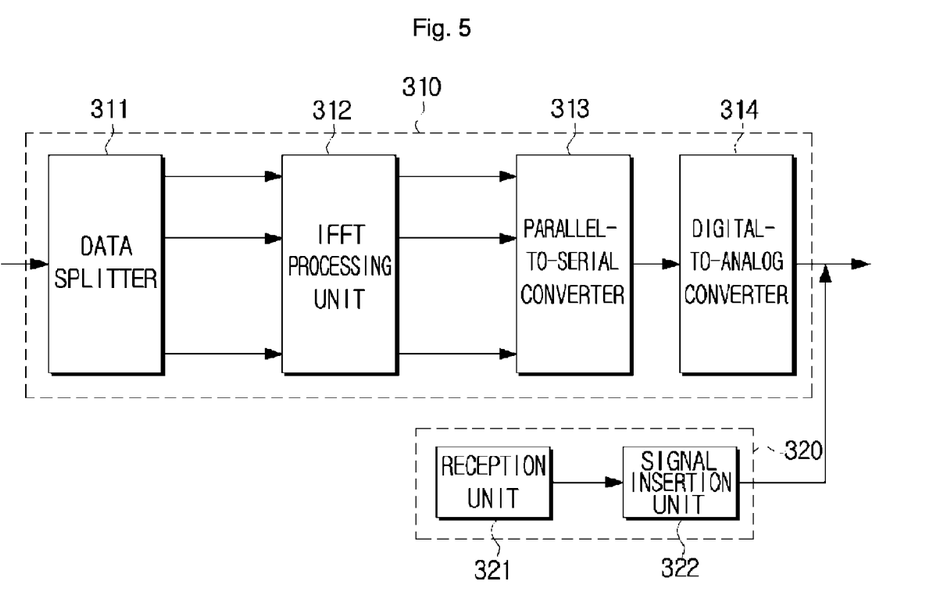

FIG. 5 illustrates an exemplary configuration to describe an exemplary embodiment in which low power signals are inserted in an analog format. In FIG. 5, a transmission signal generation unit 310 includes a data splitter 311, an IFFT processing unit 312, a parallel-to-serial converter 313, and a digital-to-analog converter 314. Description of these elements has been given with reference to FIG. 2, so detailed description is omitted here.

An additional data processing unit 320 loads low power analog signals expressing additional data on transmission signals converted in an analog format by the digital-to-analog converter 314. That is, the reception unit 321 receives analog low power signals directly from an external source, or converts data received from an external into analog low power signals, and thus transmits the analog low power signals to the signal insertion unit 322. Therefore, the signal insertion unit 322 loads the analog low power signal on transmission signals output by the digital-to-analog converter 314.

In the above exemplary embodiments of the present invention, additional data may be compensation signal data for canceling a peak-to-average power ratio (PAPR). In OFDM, since data is transmitted using multi-carriers, the size of amplitude of the final OFDM signal is the sum of the size of the amplitude of the multi-carrier waves and the range of amplitude is wide. In particular, if the phase of each multi-carrier is the same, the size of the amplitude of the final OFDM signal is very high. Accordingly, if the PAPR is higher than a threshold value, it is out of a linear operation range of a high power linear amplifier, so distortion occurs during a linear amplification process. In order to compensate for such distortion, a compensation signal having a corresponding peak is generated in a location where a peak out of the threshold value exists, so the two signals are subtracted and the PAPR can be compensated for.

The PAPR may be reduced by loading a low power signal expressing such a compensation signal on each carrier signal.

Figure 6:
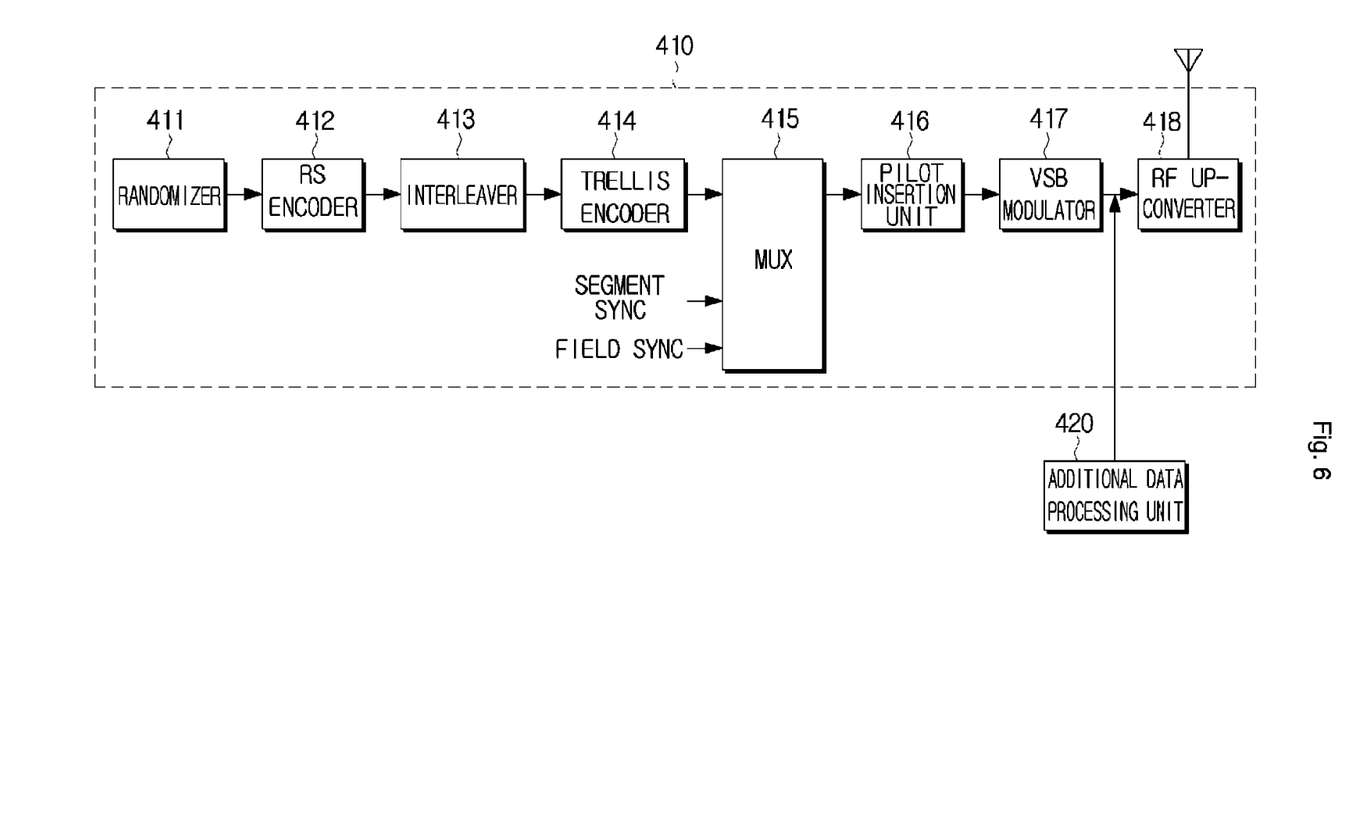

FIG. 6 is a block diagram illustrating the configuration of a digital transmission system according to yet another exemplary embodiment of the present invention. The digital transmission system includes a transmission signal generation unit 410 and an additional data processing unit 420, which are implemented in the VSB standard.

The transmission signal generation unit 410 includes a randomizer 411, an Reed Solomon (RS) encoder 412, an interleaver 413, a trellis encoder 414, a multiplexer (MUX) 415, a pilot insertion unit 416, a VSB modulator 417, and a radio frequency (RF) up-converter 418.

The randomizer 411 randomizes a data stream to be transmitted. The RS encoder 412 performs RS encoding by adding parity bytes to the transmission stream in order to correct errors occurring due to characteristics of a channel during transmission process. The interleaver 413 interleaves the RS-encoded data in a certain pattern. The trellis encoder 414 performs trellis encoding. The MUX 415 inserts a field sync and a segment sync into the trellis-encoded transmission stream. The pilot insertion unit 416 inserts a pilot tone with a direct current (DC) value into the signal output by the MUX 415.

The VSB modulator 417 performs VSB modulation, and the RF up-converter 418 up-converts the transmission stream into a signal in the RF channel band, and transmits the converted signal via an antenna. Following this process, the transmission signal generation unit 410 generates a time domain single-carrier signal.

The additional data processing unit 420 loads a low power signal expressing additional data on the single-carrier signal generated by the transmission signal generation unit 410. In this case, the low power signal may be loaded in a digital or analog format.

Since a signal output by the VSB modulator 417 has an analog format, the additional data processing unit 420 loads the analog low power signal on a single-carrier signal.

However, the additional data processing unit 420 may load a digital low power signal on a digital transmission stream output by the MUX 415, which is not illustrated in FIG. 6.

Alternatively, before the segment sync and the field sync are inserted, the digital low power signal may be loaded on a digital transmission stream output by the trellis encoder 414.

The additional data processing unit 420 may have a configuration including a reception unit (not shown) and a signal insertion unit (not shown), as illustrated in FIGS. 2, 4, and 5.

In the VSB standard, a single frame used in a U.S. digital broadcast (8-VSB) system consists of 2 fields. Each field consists of a single field sync segment, which is the first segment, and 312 data segments. In the VSB data frame, a single segment corresponds to a single MPEG-2 packet, and consists of a segment sync signal of 4 symbols, and 828 data symbols.

The additional data processing unit 420 divides low power signals expressing additional data, and loads divided signals on each segment. Accordingly, a receiver detects the additional data by collecting the low power signals dispersed in each segment.

As described in the exemplary embodiments of FIGS. 2, 4 and 5, the additional data processing unit 420 may transmit additional data of 1 bit using all the segments of a single field, or may transmit a single set of the additional data on each group of segments.

Figure 7:
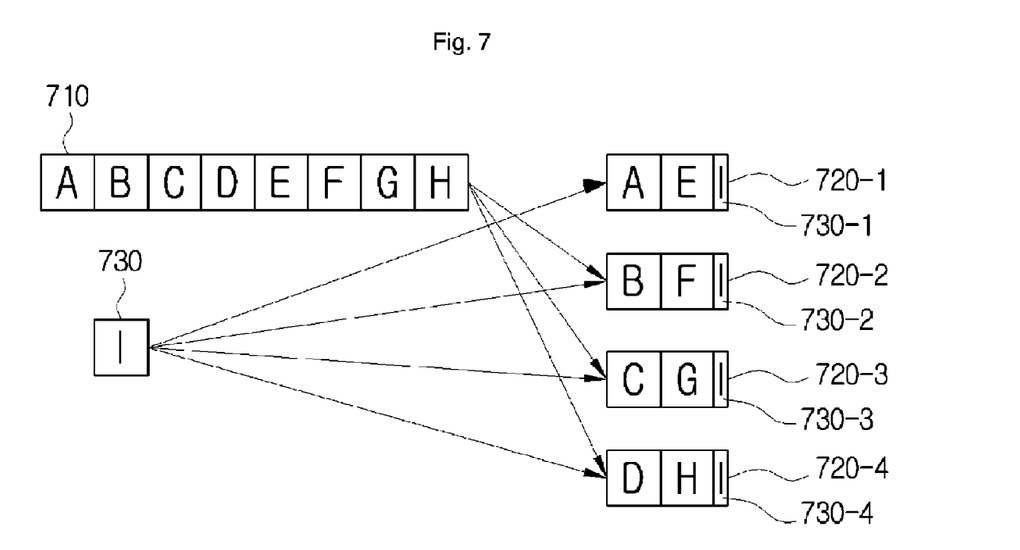
FIG. 7 is a mimetic diagram conceptually illustrating a process of generating a signal in a digital transmission system according to an exemplary embodiment of the present invention.

FIG. 7 is a mimetic diagram conceptually illustrating a process of loading additional data in the digital transmission system of FIG. 2. In FIG. 7, a data stream ABCDEFGH 710 is divided into a plurality of carrier signals, AE, BF, CG, and DH by the transmission signal generation unit 210.

The additional data processing unit 220 receives additional data I 730, and generates a plurality of low power signals 730-1 to 730-4. Accordingly, multi-carrier signals 720-1 to 720-4 are generated as illustrated in FIG. 7 by inserting each low power signal into each carrier signal AE, BF, CG, and DH. A receiver detects the additional data I 720 by collecting the low power signals from the multi-carrier signals 720-1 to 720-4.

Figure 8:
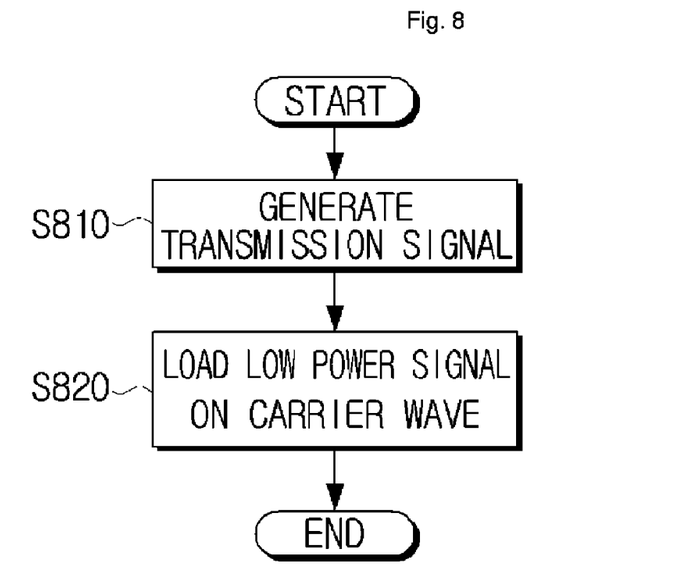
FIG. 8 is a flow chart illustrating a digital transmission method according to an exemplary embodiment of the present invention.

FIG. 8 is a flow chart illustrating a digital transmission method according to an exemplary embodiment of the present invention. In FIG. 8, a transmission signal is generated according to the DVB-T or VSB standard (S810). A low power signal expressing separately received additional data is loaded on the generated transmission signal (S820). The transmission signal generated according to DVB-T standard can load the low power signal in a frequency domain or in a time domain, and in digital or analog format.

The transmission signal generated according to VSB can load the low power signal in a time domain, and in digital or analog format.

Figure 9:
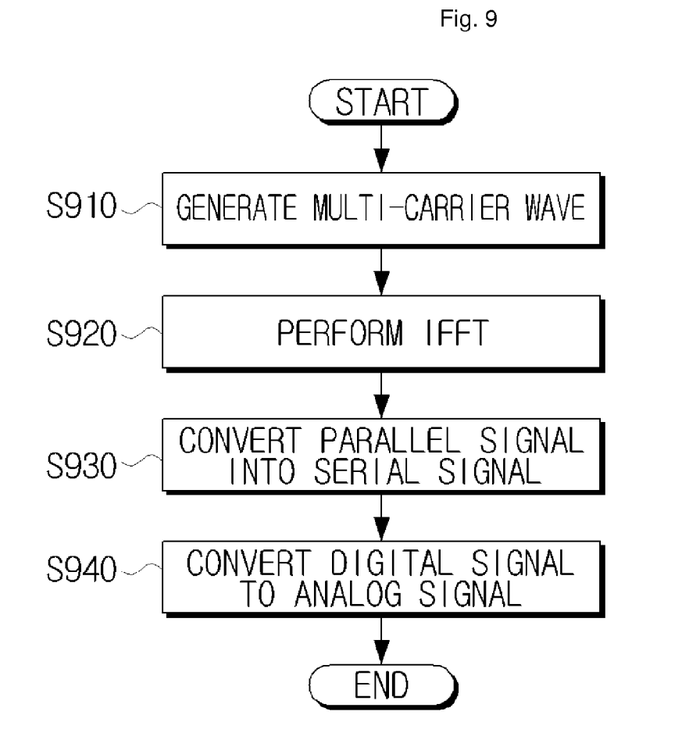
FIG. 9 is a flow chart illustrating a digital transmission method according to diverse exemplary embodiments of the present invention.

FIG. 9 is a flow chart illustrating in detail the process of generating a transmission signal according to the DVB-T standard. In FIG. 9, data to be transmitted are modulated, and a plurality of carrier waves, that is, multi-carrier signals are thus generated (S910). In an exemplary embodiment in which a low power signal is inserted in frequency domain, low power signals can be loaded directly on the generated multi-carrier signals.

The generated multi-carrier signals are IFFT-processed, and are thus converted into time domain carrier signals (S920). The converted carrier signals are converted into serial signals (S930). As described here, in an exemplary embodiment in which a low power signal is inserted in a time domain, low power signals can be loaded on the IFFT-processed multi-carrier signals or on the serial signals.

Subsequently, the serial signals are converted from digital format to analog format (S940). As described here, in an exemplary embodiment in which an analog low power signal is loaded, the low power signals can be loaded after digital-to-analog conversion.

FIG. 9 describes only the process of generating transmission signals according to the DVB-T standard, but the digital transmission method can also be applied to transmission signals according to the VSB standard. In this case, transmission signals are generated by performing processes such as randomizing, RS encoding, interleaving, trellis encoding, sync multiplexing, pilot insertion, VSB modulation, and RF up-converting, in sequence. Accordingly, a digital low power signal can be loaded on a trellis-encoded transmission signal or on a sync-multiplexed transmission signal, or an analog low power signal can be loaded on a VSB-modulated transmission signal.

Detailed description thereof has been given with reference to FIG. 6 above, so additional description is omitted here.

While the invention has been shown and described with reference to certain exemplary embodiments thereof, it will be understood by those skilled in the art that various changes in form and details may be made therein without departing from the spirit and scope of the invention as defined by the appended claims.

Moreover, the foregoing embodiment and advantages are merely exemplary and are not to be construed as limiting the present invention. The present teaching can be readily applied to other types of apparatuses. The description of the exemplary embodiments of the present invention is intended to be illustrative, and not to limit the scope of the claims.

The invention claimed is:

1. A digital transmission system comprising:
    a transmission signal generation unit which generates transmission signals by loading first data to be transmitted on multi-carrier waves; and
    an additional data processing unit which loads a plurality of low power signals each expressing additional data on the multi-carrier waves on which the first data was loaded by the transmission signal generation unit, the additional data processing unit divides the multi-carrier waves into a plurality of groups, and loads the plurality of low power signals expressing respective sets of additional data on each of the plurality of groups, so that a plurality set of additional data are transmitted on the multi-carrier waves with the first data,
    wherein a first group including at least one low power signal among the plurality of low power signals expresses compensation data for canceling a peak-to-average power ratio in a location where the peak-to-average power ratio is greater than a threshold value,
    wherein a second group of low power signals among the plurality of low power signals express additional information to be provided to a user, different from information included in the first data, and
    wherein the digital transmission system transmits the generated transmission signals loaded with the first data and the additional data.

2. The digital transmission system of claim 1, wherein the transmission signal generation unit is further configured to generate the transmission signals using an Orthogonal Frequency Division Multiplexing scheme by loading the first data on the multi-carrier waves.

3. The digital transmission system of claim 2, wherein the additional data processing unit is further configured to load the second group of low power signals on the multi-carrier waves using at least one of a pseudo random sequence, a gold sequence, and a Kasami sequence.

4. The digital transmission system of claim 2, wherein the additional data processing unit is further configured to encode the second group of low power signals and load the encoded low power signals on the multi-carrier waves.

5. The digital transmission system of claim 2, wherein the additional data processing unit is further configured to load the second group of low power signals on at least one of an in-band area, in which the first data were inserted, and an out-band area, which forms a guard between channels, in the multi-carrier waves.

6. The digital transmission system of claim 2, wherein the transmission signal generation unit further comprises:
    a data splitter which performs modulation to load the first data on the multi-carrier waves;
    an inverse fast Fourier transform (IFFT) processing unit which performs an IFFT to the multi-carrier waves generated by the data splitter;
    a parallel-to-serial converter which converts the IFFT-processed multi-carrier waves into a single serial signal; and
    a digital-to-analog converter which converts the serial signal from a digital format to an analog format.

7. The digital transmission system of claim 6, wherein the additional data processing unit further comprises:
    a reception unit which receives the additional data from an external source, and generates the low power signals in a frequency domain; and
    a signal insertion unit which loads the low power signals on the multi-carrier waves generated by the data splitter.

8. The digital transmission system of claim 6, wherein the additional data processing unit further comprises:
- a reception unit which receives the additional data from an external source, and generates the low power signals in a time domain; and
- a signal insertion unit which loads the low power signals on the IFFT-processed multi-carrier waves output by the IFFT processing unit.

9. The digital transmission system of claim 6, wherein the additional data processing unit further comprises:
- a reception unit which receives the additional data from an external source, and generates the low power signals in a time domain; and
- a signal insertion unit which loads the low power signals on analog signals output by the digital-to-analog converter.

10. The digital transmission system of claim 1, wherein an electric power of the second group of low power signals expressing the additional data are less than an electric power of the multi-carrier waves on which the first data was loaded.

11. A digital transmission method comprising:
- generating transmission signals, in a transmission signal generation unit, by loading first data to be transmitted on multi-carrier waves;
- loading a plurality of low power signals each expressing additional data on the multi-carrier waves on which the first data was loaded by the transmission signal generation unit, wherein said loading the low power signals each expressing the additional data on the multi-carrier waves comprises dividing the multi-carrier waves into a plurality of groups, and loading the low power signals expressing respective sets of additional data on each of the plurality of groups, so that a plurality set of additional data are transmitted on the multi-carrier waves with the first data; and
- transmitting the generated transmission signals including the first data and the additional data,
- wherein a first group including at least one low power signal among the plurality of low power signals expresses compensation data for canceling a peak-to-average power ratio in a location where the peak-to-average power ratio is greater than a threshold value, and
- wherein a second group of low power signals among the plurality of low power signals express additional information to be provided to a user, different from information included in the first data.

12. The method of claim 11, wherein the generating the transmission signals further comprises generating the transmission signals using an Orthogonal Frequency Division Multiplexing method by loading the first data on the multi-carrier waves.

13. The method of claim 12, wherein the loading the low power signals further comprises loading the second group of low power signals on the multi-carrier waves using at least one of a pseudo random sequence, a gold sequence, and a Kasami sequence.

14. The method of claim 12, wherein the loading the low power signals further comprises encoding the second group of low power signals and loading the encoded low power signals on the multi-carrier waves.

15. The method of claim 12, wherein the loading the low power signals further comprises loading the second group of low power signals on at least one of an in-band area, in which the first data were inserted, and an out-band area, which forms a guard between channels, in the multi-carrier waves.

16. The method of claim 12, wherein the generating the transmission signals further comprises:
- generating the multi-carrier waves, in a data splitter, by performing modulation to load the first data on the multi-carrier waves;
- performing an inverse fast Fourier transform (IFFT) to the multi-carrier waves output by the data splitter;
- converting the IFFT-processed multi-carrier waves into a single serial signal; and
- converting the serial signal from a digital format to an analog format.

17. The method of claim 16, wherein the loading the low power signals expressing the additional data further comprises:
- receiving the additional data from an external source, and generating the low power signals in a frequency domain; and
- loading the low power signals on the multi-carrier waves in the frequency domain.

18. The method of claim 16, wherein the loading the low power signals expressing the additional data further comprises:
- receiving the additional data from an external source, and generating the low power signals in a time domain; and
- loading the low power signals on the IFFT-processed multi-carrier signals in the time domain.

19. The method of claim 16, wherein the loading the low power signals expressing the additional data further comprises:
- receiving the additional data from an external source, and generating the low power signals in a time domain; and
- loading the low power signals on the digital-to-analog-converted signals in the time domain.

20. The method of claim 11, wherein an electric power of the second group of low power signal expressing the additional data are less than an electric power of the multi-carrier waves on which the first data was loaded.

* * * * *